United States Patent
Thede

(10) Patent No.: US 7,289,986 B2
(45) Date of Patent: Oct. 30, 2007

(54) METHOD AND SYSTEM FOR INDEXING AND SEARCHING CONTENTS OF EXTENSIBLE MARKUP LANGUAGE (XML) DOCUMENTS

(76) Inventor: David Victor Thede, 6852 Tulip Hill Ter., Bethesda, MD (US) 20816

( * ) Notice: Subject to any disclaimer, the term of this patent is extended or adjusted under 35 U.S.C. 154(b) by 462 days.

(21) Appl. No.: 10/902,144

(22) Filed: Jul. 30, 2004

(65) Prior Publication Data

US 2005/0004935 A1    Jan. 6, 2005

Related U.S. Application Data

(62) Division of application No. 09/549,533, filed on Apr. 14, 2000, now Pat. No. 6,782,380.

(51) Int. Cl.
G06F 17/30    (2006.01)
G06F 7/00     (2006.01)

(52) U.S. Cl. ................ 707/3; 707/5; 707/102

(58) Field of Classification Search ............. 707/1–7, 707/10, 100–103 R, 104.1; 709/206, 218, 709/224, 229; 704/9, 272; 715/508, 512, 715/513, 531, 533

See application file for complete search history.

(56) References Cited

U.S. PATENT DOCUMENTS

| | | | |
|---|---|---|---|
| 5,701,459 A * | 12/1997 | Millett et al. ................ 707/3 |
| 5,701,469 A | 12/1997 | Brandli et al. |
| 5,703,655 A | 12/1997 | Corey et al. |
| 5,721,897 A | 2/1998 | Rubinstein |
| 5,778,361 A | 7/1998 | Nanjo et al. |
| 5,913,208 A | 6/1999 | Brown et al. |
| 5,913,209 A * | 6/1999 | Millett ........................ 707/3 |
| 5,963,940 A | 10/1999 | Liddy et al. |
| 6,026,388 A | 2/2000 | Liddy et al. |
| 6,094,649 A * | 7/2000 | Bowen et al. ................ 707/3 |
| 6,167,393 A | 12/2000 | Davis, III et al. |
| 6,240,407 B1 | 5/2001 | Chang et al. |
| 6,266,094 B1 | 7/2001 | Taylor, Jr. |
| 6,269,362 B1 | 7/2001 | Broder et al. |
| 6,345,252 B1 | 2/2002 | Beigi et al. |
| 6,360,215 B1 * | 3/2002 | Judd et al. ................ 707/3 |
| 6,366,934 B1 | 4/2002 | Cheng et al. |
| 6,418,448 B1 * | 7/2002 | Sarkar ................ 707/104.1 |
| 6,421,656 B1 | 7/2002 | Cheng et al. |
| 6,466,940 B1 | 10/2002 | Mills |
| 6,636,845 B2 | 10/2003 | Chau et al. |
| 6,782,380 B1 * | 8/2004 | Thede ......................... 707/3 |
| 2001/0007987 A1 | 7/2001 | Igata |
| 2002/0133484 A1 | 9/2002 | Chau et al. |
| 2003/0041053 A1 * | 2/2003 | Roth ........................... 707/3 |
| 2003/0140027 A1 * | 7/2003 | Huttel et al. ................ 707/1 |
| 2005/0256900 A1 * | 11/2005 | Huttel et al. .............. 707/102 |

OTHER PUBLICATIONS

Ishikawa et al., "Document Warehouse Based On A Multimedia Database System," IEEE, 1999, pp. 168-173.

* cited by examiner

*Primary Examiner*—Jeffrey Gaffin
*Assistant Examiner*—Jacques Veillard
(74) *Attorney, Agent, or Firm*—Foley & Lardner LLP

(57) ABSTRACT

A method and a computer system for indexing and searching the data content of nested field records, such as those in Extensible Markup Language (XML). The system includes an indexing and searching engine that constructs an improved full-text search index on the input XML data and then performs searches using the index. The system supports exact matches and partial matches using a wildcard character. The method transforms the input XML data into a form that encodes the data structural information by suffixing each word with its corresponding field qualifiers or an equivalent numerical pattern thereof. The resulting encoded words are then stored in a full-text index structure. Various types of full-index search may be performed. One alternative embodiment is to combine string matching and numeric or integer pattern matching to identify a particular word in a particular field. The portion of the word without field qualifiers is matched against the words in the index, and the pattern of numerals representing the word's field qualifiers is matched against the numeral patterns of the words in the index that correspond to their respective field qualifiers. Therefore, evaluation of complex field criteria is reduced to simpler and faster numeric matching.

4 Claims, No Drawings

METHOD AND SYSTEM FOR INDEXING AND SEARCHING CONTENTS OF EXTENSIBLE MARKUP LANGUAGE (XML) DOCUMENTS

FIELD OF THE INVENTION

The present invention relates to methods and systems to index and search records stored in a language using nested fields, particularly those stored in the Extensible Markup Language (XML). In particular, the present invention relates to an improved method and a computerized system to index and search documents and data in languages such as XML that utilize nested fields.

BACKGROUND OF THE INVENTION

The Extensible Markup Language (XML) is a universally accepted format for representing structured data in textual form. It is widely adopted in enterprise databases, and particularly in databases and applications connected to the World Wide Web. The manipulation and exchange of structured data, e.g., spreadsheets, address books, financial transactions, technical drawings, etc., is often challenging as the data is traditionally represented in platform or program dependent document formats. XML provides a set of rules and guidelines for designing text formats for such data; these XML text formats are unambiguous, platform-independent, and extensible.

An example of a simple XML document is provided as follows:

```
<record>
    <name>
        <first_name>
            John
        </first_name>
        <last_name>
            Smith
        </last_name>
    </name>
    <address>
        <street>
            123 Smith Drive
        </street>
        <city>
            New York
        </city>
        <state>
            New York
        </state>
    </address>
</record>
```

Basic XML format includes tags with brackets, e.g., <city> begins a field and </city> ends a field. Thus, <city> New York </city> represents a field named "city" that contains the content "New York." Fields can be nested, e.g., "city" is an element in the field "address," as shown above. More complex syntax can be used for various types of data.

A key practical issue in realizing advantages afforded by XML is the need for an efficient search method. Easy data manipulation and exchange requires an effective method to handle computational intensive search operations for complex and concurrent queries, which are becoming common place in the use of networked enterprise databases and databases connected to the Internet.

Existing database management systems, such as relational database and object-oriented database systems, are generally equipped with mechanisms or facilities for rapidly retrieving selected records based on key fields in the database. Such facilities or mechanisms often depend upon the data and the schema, and therefore are specific to each database. A variety of complex data structures are implemented in databases to facilitate fast retrieval of data based on key fields; examples include binary trees, B-trees, and red-black trees. Additionally, various types of indices are built for certain key words or fields that are frequently queried in a database to enable fast searching on those words and fields.

Existing full-text indices allow rapid searches on any word in a body of text. They are commonly used by Internet search engines such as Hotbot and Alta Vista to enable a user to quickly identify a particular Web site. Although they vary considerably in their implementation, full-text indices essentially consist of a table of words in alphabetical order, with pointers or links to the corresponding locations of the words in a database or a file. Generally a full-text index also supports wildcard (represented by "*") searches that locate words based on a partial match. For example, a search for "appl*" will find "apply," "appliance," etc.

Neither of these existing technologies provides an efficient way to search XML. Since XML represents structural data in a textual format, it lends itself only to a slow, sequential scan of the text in a search of a particular record. Standard full-text indexing provides only an incomplete solution because the field context of each word is not preserved. For example, a standard full-text index of the sample XML document above supports a search for "Smith," but not for "Smith" only in the "address" field. That is, one cannot locate an address with "Smith" in it using a full-index search; such a search will find all records in any field that has "Smith" in it. Some full-text indexing systems have the ability to search for a word associated with a particular property or field of a document (such as "Author is John Smith"), but this still does not provide a way to search based on the structural context of a word in an XML file, which involves several nested field qualifiers.

Therefore, much needed is an improved full text indexing mechanism for searching XML data, which is capable of distinguishing between "Smith" in the last_name field and "Smith" in the street field, or between "New York" in the city field and "New York" in the state field. Such a mechanism should also preserve information on nested fields, so that the street field is recognized as an element within the address field, and the last_name field is recognized as an element of the name field. The queries such as "address contains New York" (search for any record that contains New York in the address field or any field under the address field) and "address/city contains New York" (search for any record that contains New York in the city field that is part of an address field) should rapidly retrieve the qualified records using such an improved indexing and searching mechanism. To make fast and effective searches possible, certain external data structures need to be constructed to preserve the inherent structure information in the XML data and to provide a short cut to locate particular items.

However, the current state of the art only provides limited alternatives for indexing and searching XML data. One approach is to create separate indices for each sub-fields, which preserves the structural information of the data but drastically increases the overhead and therefore is not desirable. Another approach is to use a directed graph to represent the nested fields. (Goldman R. et al., Lore: a database management system for XML, 2000) The search through a directed graph can be extremely computationally intensive and costly as the complexity of the data, hence complexity of the graph, grows. Both approaches result in an index structure whose complexity is comparable with that of the XML data itself. A more efficient and cost-saving indexing and searching method is desired.

SUMMARY OF THE INVENTION

To resolve the above problems, the present invention is directed to an improved method and a computer system for indexing and searching records in a language utilizing nested fields, such as XML. The present invention discloses an indexing and searching engine that constructs an improved full-text search index on the input XML data and then performs searches using the index. The indexing and searching engine according to the preferred embodiment of this invention supports exact matches and partial matches using a wildcard character.

In accordance with one aspect of the present invention, the method transforms the problem of indexing and searching nested field records, including XML data, into the problem of full-text indexing and searching of plain text documents. The input XML data is changed into a form that encodes the field structural information by suffixing each word with its corresponding field qualifiers in their nested entirety, or alternatively, by suffixing each word with a numerical code pattern that represents the word's corresponding field qualifiers in their nested entirety. The resulting encoded words are then stored in a full-text index structure.

In accordance with another aspect of the present invention, wildcard matching may be used to perform searches with or without field qualifiers. To search using a wildcard without field qualifiers allows identifying a record including a particular word regardless the field of the record, whereas to search using a wildcard with field qualifiers allows identifying a record including a particular word in a designated field or fields that share certain level of similarly nested structure.

In accordance with yet another aspect of the present invention, a combination of string matching and integer pattern matching is used in the search of a particular word. The portion of the word without field qualifiers is first matched against the words in the index, and then the word's field qualifiers are transformed into a pattern of numerals, e.g., integers, to be matched against the integer patterns of the words in the index that correspond to their respective field qualifiers. Therefore, evaluation of complex field criteria is reduced to simpler and faster numeric matching.

The present invention with all aspects of a method and computer system for indexing and searching nested field records, such as XML data and documents, significantly improves the effectiveness and speed of the search, and hence facilitates full realization of advantages of XML as an extensible, portable data exchange format.

Further features, objects, and advantages of the present invention are apparent in the examples and in the detailed description that follows.

DETAILED DESCRIPTION OF THE PREFERRED EMBODIMENT

Indexing

Though the present invention is described here with particular reference to XML records, the present invention extends to any nested field record where a series of fields and sub-fields are used to nest data from a record.

According to a preferred embodiment of this invention, a nested field record, such as an XML document or any data stored in XML form, is transformed into a text of words that encode the field structure context of each word in the XML data. The transformation is accomplished by giving each word in the XML document a suffix that represents the field information. First, each field name is assigned a numerical code, such as an integer. For example, the following encoding may be used in the sample XML document provided in the Background section:

record=1
name=2
first_name=3
last name=4
address=5
street=6
city=7
state=8

Second, each word is assigned a suffix according to the numerical encoding of its field or nested fields. For example, in the sample XML document, the first occurrence of "Smith" is found in the record/name/last_name field, the numerical coding or pattern of this nested field qualifiers is therefore "1/2/4," and this record is represented as "Smith1/2/4." Similarly, the second occurrence of "Smith" is found in the record/address/street field, the numerical coding or pattern is therefore "1/5/6," and this record is represented as "Smith1/5/6." Using the same encoding mechanism, the sample XML document would be transformed to the following text for indexing:

John/1/2/3
Smith/1/2/4
123/1/5/6
Smith/1/5/6
Drive/1/5/6
New/1/5/7
York/1/5/7
New/1/5/8
York/1/5/8

And accordingly, a full-text index for this transformed data may be built as follows:

123/1/5/6
Drive/1/5/6
John/1/2/3
Smith/1/2/4
Smith/1/5/6
New/1/5/7
New/1/5/8
York/1/5/7
York/1/5/8

Depending upon the complexity of the XML data, deeply nested structures may be reduced to lists of words suffixed by longer numeral or integer strings. There is no intrinsic limitation to this method; both the length of the word lists and the length of the suffix string may grow. Therefore, the method of indexing according to the present invention is much more efficient, robust, and less computationally-intensive compared to available methods such as building separate index for every field.

In an alternative embodiment of this invention, the field structure context of each word is encoded using strings of field names in the nested order. For example, as discussed above, the first occurrence of "Smith" is found in the record/name/last_name field, so this record may be represented as "Smith/record/name/last_name." Similarly, the second occurrence of "Smith" is found in the record/address/ street field, and this record may be represented as "Smith/record/address/street." Using this encoding mechanism, the sample XML document would be transformed to the following text for indexing:

John/record/name/first_name
Smith/record/name/last_name
123/record/address/street
Smith/record/address/street
Drive/record/address/street
New/record/address/city
York/record/address/city
New/record/address/state
York/record/address/state And accordingly, a full-text index for this transformed data may be built as follows:

123/record/address/street
Drive/record/address/street
John/record/name/first_name
New/record/address/city
New/record/address/state
Smith/record/address/street
Smith/record/name/last_name
York/record/address/city
York/record/address/state The two alternative indexing methods according to the present invention may be used interchangeably for XML data of limited volume and complexity. However, when higher volumes of data with more complex nested field structures are involved, reducing the word suffix representation to a numeral or integer string will both save disk and memory space and decrease computational time for indexing and subsequent searches.

Searching

Once the encoded field qualifiers are stored in a full-text index along with each word, the content and the structure of the XML data are preserved. Various full-text index searches may be performed to identify a particular word in a particular field or fields using the index.

According to one embodiment of the present invention, wildcard matching may be used to perform searches with or without field qualifiers. To search for a particular word, e.g., "John", without field qualifiers, a wildcard character is added to the end of the word following the delimiter "/", e.g., "John/*". This expression will match "John" in any field. To search for a particular word with field qualifiers, field qualifiers encoded in the indexing operation are used along with wildcard characters which represent unspecified fields. For example, in the above sample XML document, two steps need to be completed to search for "New York" contained in the field "/record/address". First, "/record/address" is transformed to the integer string "/1/5", using the field encodings established when the index was created. Because the search should also cover any fields that might be nested inside the address field, a wildcard character should be added at the end, e.g., "/1/5/*". Second, the numeral pattern of the field qualifiers is appended to each search term, e.g., "New/1/5" and "York/1/5". This transformation converts any field search into an equivalent plain text search.

By way of example, the following is a computer program segment implementing the method of encoding field qualifiers by a pattern or an array of integers, according to one embodiment of the present invention. This function converts a field expression, such as "/record//name" into a corresponding numeric array. A flag "fUseWildcards" is used to specify whether a particular field expression in a search query may contain wildcard characters. For example, the query "/record//name contains Smith" finds any field "name" within a field "record" that has "Smith" as the value of the "name" field. Therefore, a wildcard character is used between the field "record" and the field "name." In other words, this expression should be able to also match "/record/patient/name", and "/record/name", etc. When a delimiter "/" is used at the beginning of the expression, such as "/record/name", the "record" field is the top level field element. When there is no "/" at the beginning of the expression, such as "record/name", the "record" field can be nested inside other fields. That is, "record/name" can match expressions such as "/table/record/name" and "/customer/record/name." Therefore, a wildcard character should be used at the front of a field expression when there is no delimiter "/".

To perform the encoding, the input field expression is tokenized based on the delimiter "/". Each string token is then assigned to a numeric value or identifier by calling the function "getFieldId." If there is no identifier returned, the token is inserted into the table of field names so that a unique id can be created for the token by a separate function.

```
void encodeFieldExpression(const char *expr, FieldIdList&
fieldId, int fUseWildcards) {
    if (fUseWildcards) {
        if (*expr != '/')
            fieldId.append(matchAny);
        else
            *expr ++;
    }
    DStringSet s;
    s.tokenize(expr, '/', fUseWildcards);
    for (int i = 0; i < s.getCount( ); ++i) {
        const char *str = s.getString(i);
        if (strIsBlank(str))
            fieldId.append(matchAny);
        else {
            long id = getFieldId(str);
            if (id == FAIL) {
                id = add(s.getString(i));
                fieldId.append(id);
            }
        }
    }
}
```

By way of example, the following is a computer program segment implementing pattern-matching using numeral encoding of field qualifiers, according to one embodiment of the present invention. Suppose "a" is the numeric encoding of the field qualifiers of a word in the index, and "b" is the numeric encoding of a field qualifier in a search query. Each of the integers in the "a" and "b" arrays corresponds to a field name. The "b" array may contain wildcard characters so that the query will support words with similarly nested field structures. For example, as discussed above, the query "/record//name contains Smith" matches any field "name" within a field "record" that has "Smith" as the value of the "name" field. To match this expression, the "b" array would contain: <record code>, <matchAny>, <name code>, where <record code> is the integer corresponding to the "record" field, <matchAny> is a wildcard character that matches any number of values, and <name code> is the integer corresponding to the "name" field.

```
static int lMatch(const long *a, const long *b) {
    while (*a && *b)
        if ((*a == *b) || (*b == matchOne)) {
```

-continued

```
            a++;
            b++;
        }
        else if (*b == matchAny) {
            b++;
            if (!*b)
                return true;
            while (*a) {
                if (lMatch(a, b))
                    return true;
                else
                    a++;
            }
            return false;
        }
        else
            return false;
    if (*a)
        return false;
    if (*b) {
        if (*b != matchAny)
            return false;
        b++;
        if (*b)
            return false;
    }
    return true;
}
```

A modified matching method is used in an alternative embodiment of the present invention. This method uses a combination of string matching and integer pattern matching to identify a particular word in a particular field or fields. First, the portion of the word absent the field identifiers or their numeral encoding is matched against words in the index, to identify the matched records. This is a typical word look-up used for a text search that is not limited by fields. Second, the field expression of the search query is transformed into an numeral or integer pattern, which is then matched against the numerical encoding representing field qualifiers of each word in the index. The resulting matches are subsequently combined with the matches from the first step. For example, a search request "address/street contains Oak" may be converted to the integer pattern (*,5,6,*) associated with the word "Oak". The wildcard character at the beginning and the end of the pattern indicate that the address field may be inside another field and that additional fields may be nested inside the street field. Therefore, evaluation of a complex field expression is reduced to a simple matching of integer patterns. Replacement of string comparisons with numerical comparisons accordingly improves the speed of the search.

Although alternative embodiments of the present invention have been described in detail, it is to be understood that the same is by way of illustration and example only, and is not to be taken by way of limitation. Other modifications and variations that do not depart from the scope and spirit of the invention are understood to be a part thereof.

All references cited above are expressly incorporated herein to the same extent as if each was individually incorporated by reference.

What is claimed is:

1. A method of indexing the content of a document in Extensible Markup Language (XML), comprising:
   modifying each word in the content of said XML document by suffixing to the word any field qualifiers associated with the word in the nested order; and
   building a full-text index with said modified words;
   wherein a field qualifier indicates information about the usage of the word in the document.

2. A method of indexing the content of a document in XML as set forth in claim 1, wherein building a full-text index further comprises placing each modified word in an alphabetic order in an index structure.

3. A method of indexing content of a document in Extensible Markup Language (XML), comprising:
   assigning a numerical code to each field qualifier in said XML document;
   creating a code pattern for each word in said XML document from the word's field qualifiers in the nested order using said numerical code;
   modifying each word by suffixing to the word said code pattern; and building a full-text index with said modified words;
   wherein a field qualifier indicates information about the usage of the word in the document.

4. A method of indexing the content of a document in XML as set forth in claim 3, wherein building a full-text index further comprises placing each modified word in an alphabetic order in an index structure.

* * * * *